March 4, 1958     A. K. VELAN ET AL     2,825,508
MONO VALVE FLOAT THERMOSTATIC STEAM TRAP
Filed June 4, 1956     2 Sheets—Sheet 1
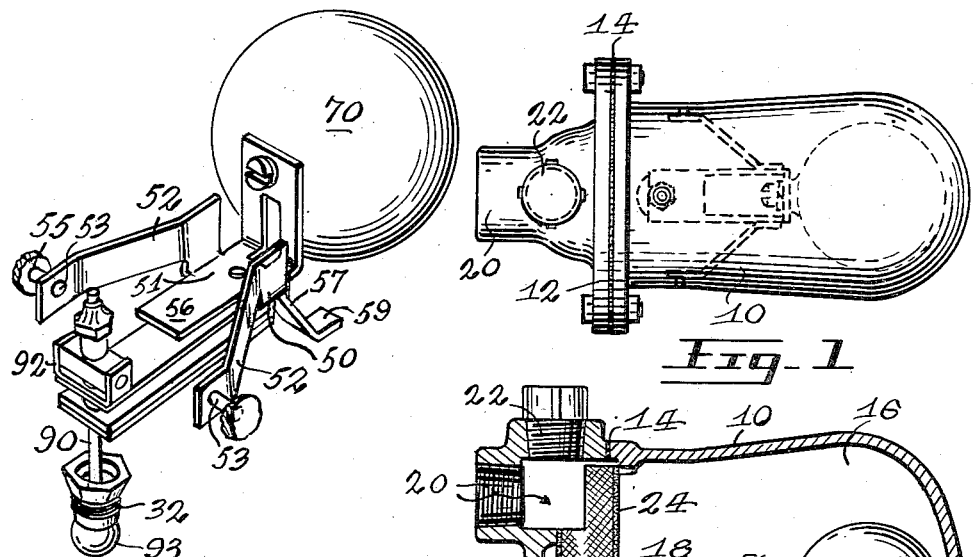
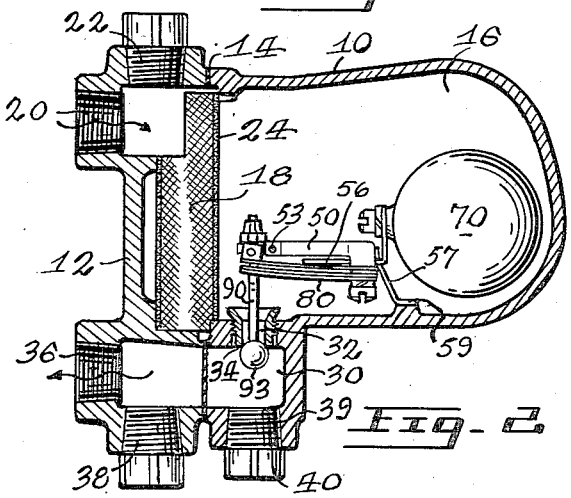
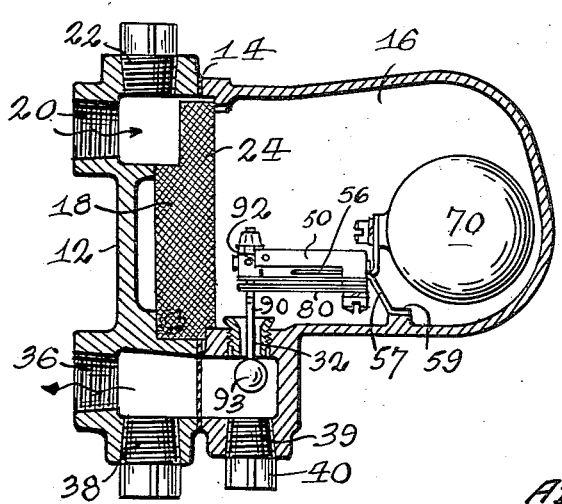
Inventor
ADOLF KAREL VELAN
ROGER RIPERT
Attorney March 4, 1958     A. K. VELAN ET AL     2,825,508
MONO VALVE FLOAT THERMOSTATIC STEAM TRAP
Filed June 4, 1956     2 Sheets-Sheet 2
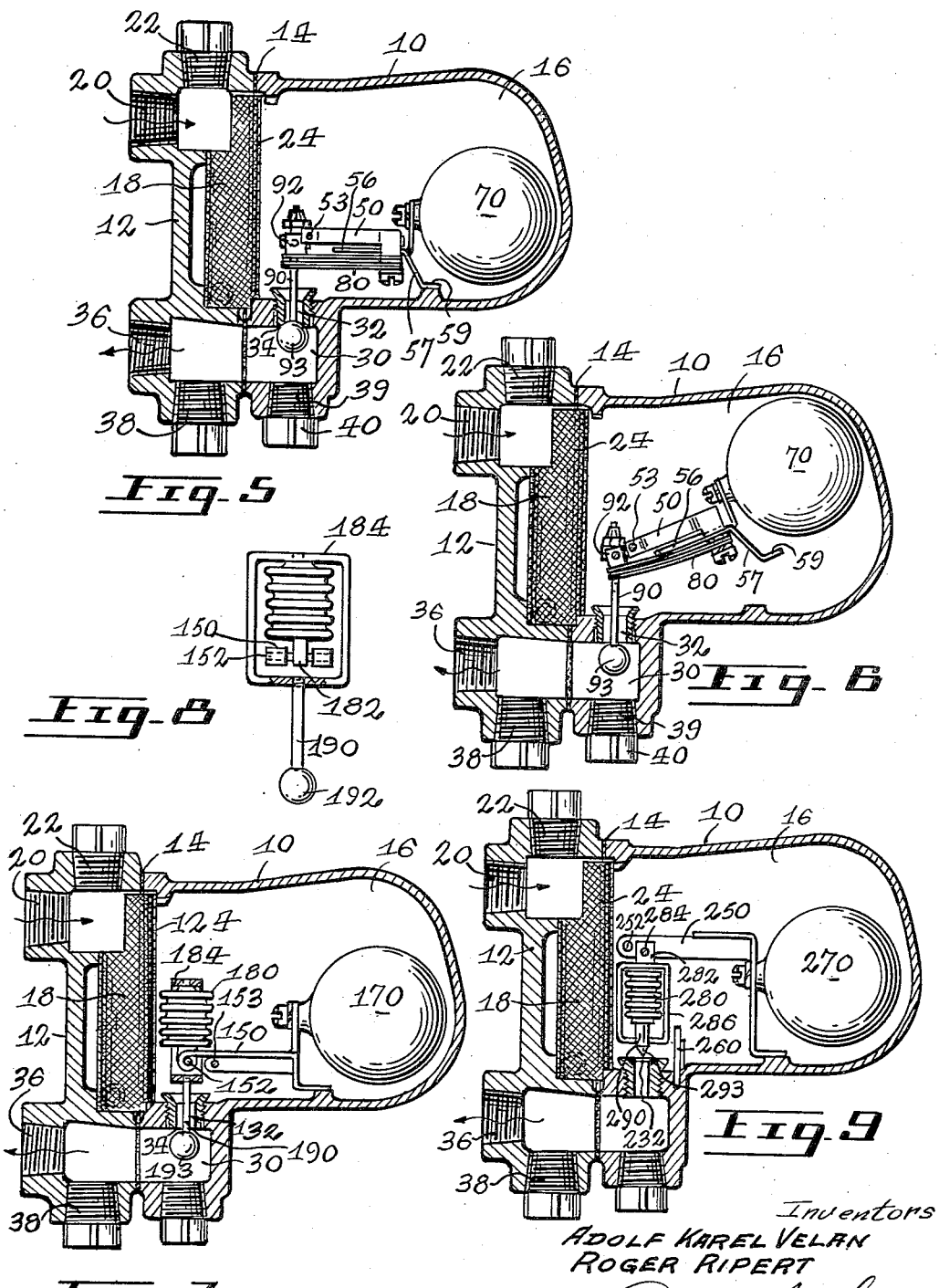

United States Patent Office 2,825,508
Patented Mar. 4, 1958

2,825,508

MONO VALVE FLOAT THERMOSTATIC STEAM TRAP

Adolf Karel Velan and Roger Ripert, Montreal, Quebec, Canada, assignors to Velan Engineering Ltd., Montreal, Quebec, Canada Application June 4, 1956, Serial No. 589,138

10 Claims. (Cl. 236—53)

The present invention relates to improvements in thermostatically controlled steam traps and is believed to present a novel design of thermostatic steam traps discharging condensate or water regardless of temperature.

All prior art thermostatically operated steam traps including the type of steam trap shown in the applicant's United States Patent 2,629,553 of February 24, 1953, require a certain temperature differential to operate and to discharge condensate. While the use of the steam trap construction disclosed in the applicant's earlier Patent 2,629,553 and that of other makes of thermostatically operated steam traps, using bi-metal, bellows or expansion rods, is satisfactory and economical, there are applications where condensate has to be discharged at the same temperature as that of steam as rapidly as it forms in the equipment. This rapid discharge of condensate is required in various heating and processing set-ups for their efficient function.

Normally used bucket traps and other designs of mechanically operated steam traps having intermittent operations are not suitable for processing work where condensate has to be discharged at steam temperature and at the same time temperature and pressure have to be maintained and controlled very accurately in the processing unit. This is due to the fact that when an inverted bucket, or other intermittently operating steam trap, is used for this purpose, the valve is rapidly closed and opened which causes an increase in pressure when the valve closes and a tendency of decreased pressure or even vacuum when the valve opens rapidly. These pressure fluctuations influence at the same time the temperature of the equipment drained.

In order to overcome this disadvantage, industry is presently using the so-called float thermostatic type of steam trap. The prior art steam traps of this nature differ little in the design and are all basically two steam traps placed in one body. One seat and valve is operated by a float mechanism discharging water continuously as it is formed, and another seat and valve is operated by a thermostatic bellows or similar arrangement to vent air. At the same time all these prior art designs have to have a specially operated steam trap mechanism to vent air. The disadvantage of this type of design lies in the principle which applies two mechanisms; one reacting to temperature and one to the difference between gas and liquid, and both mechanisms applied without exception to separate valve seats and valves. Consequently, two steam traps are installed in one body, increasing the possibility of steam leakage, as well as the cost of maintenance. Separate check valves have to be installed to prevent back flow from other equipment and separate strainers to protect the mechanism from dirt, consequently, the size and weight of this type of trap installation is considerably greater in comparison with the present invention which uses one mechanism and one valve only to perform the function of three seats and valves and three mechanisms presently used in such installations.

The present invention aims to provide an improvement in a float thermostatic type of steam trap which combines all the advantages of the applicant's thermostatically controlled trap disclosed in U. S. Patent 2,629,553 with the desired advantages of float traps discharging water regardless of temperature while eliminating the disadvantages of the prior art structures of this nature mentioned above.

Accordingly, the invention comprises a combined float and thermostatically controlled steam trap which includes a main trap body having an internal fluid chamber and fluid inlet and outlet passages leading from said chamber with a valve seat in the fluid inlet passage. A float supporting yoke is pivotally mounted within the fluid chamber on opposed pivot points provided on the chamber walls and a float is mounted on the yoke on the end remote from the pivotal connection. A thermally responsive bi-metallic element, bellows, or other thermally responsive element is mounted on the supporting yoke. An elongated valve stem is freely connected at one end to one end of the thermally responsive element so as to extend through the fluid chamber outlet passage, with the other end of the valve stem being provided with a closure head adapted to seat on the valve seat.

With this arrangement, the valve is adapted to handle and dispose of condensate regardless of temperature and at full valve opening capacity. The combination of the thermally responsive element with the free floating valve stem and closure head enables the valve to be fully thermally responsive while the providing of the float and the pivotal mounting provides opening of the valve under the influence of condensate filling the fluid chamber. The moment the fluid chamber is sufficiently filled with condensate (water), the buoyancy of the float and the force acting on the leverage by the pivotally mounted supporting yoke will overcome the closing force of the thermally responsive element developed previously by the steam and push the entire mechanism including the valve stem and closure head into a full open position allowing the condensate to be drained instantly through a very large orifice. This opening is extremely quiet and smooth as the opening force developed by the float is balanced to the last moment by the pull of the thermally responsive element. The extent of closing movement of the thermally responsive element is predetermined and restricted by suitable stop means provided on the supporting yoke so that when the yoke is pivoted upwards by the float under an accumulation of condensate the valve will remain fully open for condensate discharge even if the temperature within the fluid chamber exceeds the temperature for which the element was selected and set. These conditions, of course, are when the condensate enters the trap regardless if temperature is steam temperature or even higher. The trap vents air when starting up, traps steam, discharges water and acts as a check valve allowing the valve to move back if the pressure on the ball closure head is higher than in the steam trap inlet.

Having thus generally described the nature of the invention, particular reference will be made to the accompanying drawings, wherein there is shown by way of illustration a preferred construction of a combined float-thermostatic steam trap in accordance with the invention, and in which:

Figure 1 is a diagrammatic view in plan elevation of a steam trap construction in accordance with the invention with the relative position of the pivotal supporting yoke and float and a bi-metallic type thermally responsive element shown in dotted lines.

Figure 2 is a cross-sectional view of the construction shown in Figure 1 along the line 2—2 to illustrate the internal arrangement more clearly, with the bi-metallic element shown in a stressed condition and under the influence of fluid at steam temperature.

Figure 3 is a further cross-sectional view corresponding to Figure 2 with the bi-metallic element shown in normal unstressed condition and adapted to discharge air from the vent.

Figure 4 is a diagrammatic view in perspective elevation of the main controlling elements of the trap construction shown in Figure 1, including the pivotally mounted supporting yoke, float, and embodying a bi-metallic type thermally responsive controlling element with the valve stem and valve closure head shown in mounted condition relative to the valve seat.

Figure 5 is a further cross-sectional view of the construction shown in Figure 1 corresponding to Figures 2 and 3 to illustrate the position of the controlling elements when the valve stem is unstressed in closing position and freely acting as a check valve.

Figure 6 is a still further cross-sectional view of the construction shown in Figure 1 corresponding to Figures 2, 3 and 5 to illustrate the position of the controlling elements with the float raised by accumulation of condensate and the valve open to full condensate draining capacity.

Figure 7 is a cross-sectional view of a trap construction similar to that shown in Figure 1 but utilizing a bellows type thermally responsive expansion element, the valve being shown in full open condensate draining position.

Figure 8 is a detail view of the bellows type thermally responsive element utilized in the construction of Figure 7 to show the mounting more clearly.

Figure 9 is a cross-sectional view of a trap construction similar to that shown in Figure 7 utilizing a bellows type thermally responsive expansion element with a further variation in mounting and with the valve closure head disposed interiorly of the fluid chamber.

With particular reference to Figures 1 through 6 of the drawings, a preferred construction of a float thermostatic steam trap in accordance with the invention comprises a main trap body having a first portion 10 and a second portion 12 interconnected by suitable bolts with the usual sealing gaskets 14 being provided therebetween. The trap and body portion 10 is shaped so as to provide an internal fluid chamber 16 which communicates directly with a fluid inlet passage 18 provided in the body portion 12. Tapped openings 20, 22 lead directly to the fluid inlet passage 18 and a screen filter 24 is mounted in the passage 18 as shown most clearly in Figure 2.

The body portion 10 is also provided with a fluid outlet passage 30 which is interconnected with the lowest portion of the fluid chamber 16 by the trap opening 32 and a valve seat 34 is mounted in this opening. Tapped fluid outlet openings 36, 38 communicate directly with the fluid outlet passage 30. A further clean-out and inspection opening 39 is provided in direct alignment with the fluid outlet passage opening 32 and a plug 40 is threadably engaged in this opening.

Trap controlling mechanism

A supporting yoke 50 having spaced-apart bifurcate arms 52 is mounted in the fluid chamber 16 for pivotal movement about opposed pivotal points provided in the inner walls of the chamber 16. The yoke arms 52 are each provided with pins 53 adjacent the latter end and these pins are engaged in corresponding openings 55 provided in the chamber walls.

A float 70 is mounted directly to the end of the yoke 50 remote from the pivotal connection. This float is preferably of stainless steel and has a diameter enabling it to freely move within the chamber 16. In the preferred construction shown in Figures 1 through 6 and at a point intermediate the attachment with the float 70 and the pivotal connection mentioned above, a thermally responsive bi-metallic element 80 is connected to a cross member 51 of the supporting yoke. At this point a further extension 57 of the yoke is provided which includes a lower flange 59 portion adapted to engage with the bottom of the fluid chamber 16 so as to maintain the float 70 and the bi-metallic element 80 in the correct relative position in the absence of condensate within the fluid chamber and also to provide a point of resistance for the thermally activated movement of the element 80.

The bi-metallic element 80 is connected, as illustrated and described, to the yoke 50 at one end, the other end being free to flex under predetermined temperature conditions, as is well known to the art.

Since the flange portion 59 of the yoke 50 will be raised from contact with the bottom of the chamber 16 by the float 70 in the presence of condensate, a further extension 56 of the yoke is provided in predetermined spaced apart relationship from the top surface of the element 80 to provide a stop member adapted to restrict the valve closing movement of the element. The restricted amount of movement is predetermined and proportionate to the bi-metallic element selected and the valve closing action desired. If the degree or amount of flexure of the element 80 were not controlled by this restriction, and when the float 70 by accumulation of condensate had raised the yoke 50 to clear the flange 59, condensate temperatures higher than those for which the element 80 was selected would cause the element to continue to flex and apply a closing pull to the valve stem 90 reducing or even closing the valve orifice against the discharge of such condensate.

The elongated valve stem 90 is connected to the free end of the element 80 by an adjustable yoke 92 which permits trans-axial pivotal movement of the valve stem as well as sliding axial movement. This type of valve stem mounting on a thermostatic temperature responsive element is disclosed in detail in the applicant's U. S. Patent 2,629,553.

The other end of the elongated valve stem 90 is provided with a ball closure head 93 which is adapted under predetermined conditions of temperature, and in the absence of condensate, to seat on the outer face of the valve seat 32.

With this arrangement, the present float-thermostatic steam trap construction is adapted to control and function the venting of air, the discharge of condensate, the trapping of steam, and the back flow of condensate under all temperature conditions.

Principle of operation

When starting up, assuming that the present valve construction is incorporated in a heating or processing unit, the air in the unit must first be driven out and all air or gas entering with the condensate steam should be purged continuously from the apparatus. For this purpose the present steam trap arrangement reacts in the same way as the steam trap arrangement disclosed in U. S. Patent 2,629,553, in the absence of steam and/or condensate, neither the float 70 nor the bi-metallic element 80 act to seat the closure head 92 on the valve seat 32. Accordingly, the valve is opened to full capacity and air and gases can be discharged continuously (see Figure 3).

When steam enters the fluid chamber 16, the bi-metallic element 80 will develop a sufficient force to act on the valve stem 90 seating the closure head 93 and closing the valve. In the absence of fluid condensate the float attached to the yoke 50 will not have any reaction (see Figure 2).

When condensate enters the fluid chamber 16 at steam temperature, the bi-metallic element 80, already under the control of the steam, cannot react and the valve closure head 93 remains seated. The moment the fluid chamber is sufficiently filled with the condensate, the buoyancy of the float 70 and the force acting through the leverage of the yoke 50 will overcome the closing force of the bi-metallic element 80 and therefore force the entire arrangement, including the valve head 93, into full open position allowing the condensate to be drained instantly through the orifice of the valve seat 32 (see Figure 6). This opening is extremely quiet and smooth as the opening force developed by the float is balanced to the last moment by the pull of the bi-metallic element 80.

In the case of cool condensate at a lower temperature than steam the present valve arrangement reacts automatically to the load in a manner similar to a hand-operated valve which can be closed and opened to increase or decrease the capacity of the trap. If the condensation load is smaller and the temperature of the condensate below the differential at which the bi-metallic element 80 operates, then the float 70 returns to the bottom position within the fluid chamber 16 and the trap operates as a standard bi-metallic steam trap of the type described in the applicant's U. S. Patent 2,629,553 (see Figure 3).

The moment capacity increases and the trap cannot handle the load under standard conditions, the condensate level in the fluid chamber 16 rises, again raising the float 70 and opening the valve to full capacity (see Figure 6).

While the thermostatic element 80 shown is of a single segment type, it will be appreciated that the multi-segment type adapted to follow the curve of saturated steam can be utilized for this purpose. A preferred type of element is that shown in U. S. Patent 2,629,553.

It is also contemplated that other types of thermally responsive controlling elements might be utilized for this purpose, for example thermally responsive bellows arrangements or expanding thermally responsive rods.

Examples of such modified constructions are shown in Figures 7, 8 and 9 of the drawings wherein the thermally responsive controlling element is a bellows type expansion element.

In the construction shown in Figures 7 and 8 the supporting yoke 150 is modified to provide attachment points 152 which are pivotally connected to an expansion type thermally responsive bellows 180 by the bellows extension 182. A substantially rectangular frame 184 is connected to and supported by the bellows element 180 and a valve stem 190 having a ball closure head 193 is mounted on the frame 184 to operate through and against the valve seat 132 in a similar manner to the preferred construction previously described.

The supporting yoke 150 is pivotally mounted as before to the side walls of the fluid chambers 16 and a float 170 is connected to the end of the yoke 150 at the end remote from the connection with the bellows 180.

The operation is the same as previously described with the exception that the valve stem 190 is not free floating and therefore the combined stem 190 and ball head 193 will not act as a check valve as in the preferred constructions.

In the construction shown in Figure 9 the supporting yoke 250 is again modified so that the pivotal connection 252 is at the end and beyond the pivotal connection with a further type of thermally responsive expansion bellows 280. In this type the bellows 280 includes an extension 282 pivotally connected at 284 to the yoke 250 and frame 286 which surrounds the element and provides a guide for the valve stem 290 secured directly to the bellows 280. The valve stem 290 includes a tapered valve head 293 which is adapted to seat in the valve seat 232, in this case on the upstream side and within the fluid chamber 16. The frame 286 is maintained in alignment with the orifice of the valve seat 232 by an extension or guide 260 extending upwardly from the bottom of the chamber 216. A float 270 is attached to the end of the yoke 250 at the end remote from its pivotal mounting and the yoke extension 257 is formed so that the float 270 is positioned mainly below the yoke 250 so as to maintain alignment of the yoke and provide maximum leverage and travel to the yoke 250 under the buoyant lifting of the float 270.

The operation of this arrangement is generally similar as previously described with the exception that the valve stem 290 and valve closure head, as they are on the "upstream side" or within the fluid chamber, move away from the thermally responsive controlling element 280 rather than towards as in the previous constructions. Again, the valve stem and closure head will not act as a check valve due to the particular mounting.

If a thermally responsive rod were used as the controlling element the construction and arrangement would be generally similar. The main requirement is that the thermally responsive element be mounted on the supporting yoke, as illustrated, and that the yoke be pivotally mounted to the float chamber so that the natural buoyancy of the float acts through the leverage of the yoke to impose a further control over the movement of the valve closure heads 93, 193, 293.

A main advantage over known steam trap constructions of this general type is that the present steam trap construction is not affected by "water hammer."

It should be explained that there are two main causes of float failure in standard float traps, both of which can be generally classified as due to "water hammer." First, there is a pocket provided in standard float traps in which, at all times, there is a quantity of water in which the float is at least partially immersed so that the exposed surface is maintained at a relatively lower temperature. When steam enters the trap it condenses on the surface of the float creating an instantaneous drop of pressure or vacuum into which the water from the pocket and the incoming steam rush with tremendous velocity. The water and steam collide and the resultant shock or blow within the float chamber usually collapses and destroys the float.

The second cause is that the water column, pushed by steam into the trap body, changes its velocity to pressure as it enters the trap body and thus greatly increases the pressure within the trap body. Since all of the known standard float traps have the discharge valve closing on the valve seat on the upward side or within the trap body, this increase in pressure closes the valve tightly and the float takes the pressure shock or hammer.

In the applicant's construction the valve and valve seat are on the downward side exteriorly of and communicating with the lowest portion of the trap fluid chamber within the body so that there is no water in the chamber when steam enters. Further, since the valve head is on the downward side exteriorly of the fluid chamber, it acts as a relief valve and releases instantly against increased pressure, as mentioned above.

We claim:

1. A combined float and thermostatically controlled steam trap construction comprising the combination with a main trap body having an internal fluid chamber and fluid inlet and outlet passages leading from said chamber with a single valve seat in said fluid outlet passage; a valve outlet control assembly having a main supporting member pivotally mounted at one end within said fluid chamber adajcent said fluid outlet passage, a float mounted on the end of said supporting member remote from said pivotally mounted end, a thermally responsive control element pivotally mounted at one end on said supporting member, a valve stem connected at one end to said thermally responsive element to extend into said fluid outlet passage with a valve closure head on the other end of said valve stem disposed exteriorly of said fluid chamber and adapted to seat on said valve seat in a direction towards said thermally responsive controlling element, whereby deflection of said thermally responsive element under varying temperature conditions within said trap is adapted to cause movement of said valve closure head into and away from engagement with said valve seat and said float under accumulation of condensate with said fluid chamber and through said common pivotally mounted supporting member is adapted to overcome said thermally responsive action to move said valve closure head away from said valve seat regardless of temperature conditions within said fluid chamber.

2. A combined float and thermostatically controlled steam trap as claimed in claim 1 wherein said pivotally mounted supporting member is in the form of a bifurcate yoke with the outer ends of the arms of said yoke pivotally connected to opposed inner walls of said fluid chamber at a point between said float and said thermally responsive control element.

3. A combined float and thermostatically controlled steam trap as claimed in claim 2 wherein said yoke includes an extension adapted to engage the floor of said chamber and normally maintain said float and thermally responsive element in aligned position relative to said fluid outlet passage.

4. A combined float and thermostatically controlled steam trap as claimed in claim 1 wherein said thermally responsive element comprises at least one bi-metallic segment and said valve stem is mounted to the free end of said bi-metallic segment for sliding axial movement at a point in advance of said supporting member pivotal connection.

5. A combined float and thermostatically controlled steam trap as claimed in claim 1 wherein said thermally responsive element is an expansion bellows and said valve stem is mounted directly on said bellows.

6. A combined float and thermostatically controlled steam trap as claimed in claim 1 wherein said thermally responsive element is an expansion bellows, a valve stem supporting frame mounted fixedly on said bellows and said valve stem is connected to said valve stem supporting frame.

7. A combined float and thermostatically controlled steam trap as claimed in claim 1 wherein a stop member is mounted on said pivotally mounted supporting member above and in spaced apart substantial alignment with said thermally responsive element, said stop member being adapted to restrict the thermally responsive movement of said element to a predetermined length of travel.

8. A combined float and thermostatically controlled steam trap construction comprising the combination with a main trap body having an internal fluid chamber, a fluid inlet passage leading into the upper portion of said chamber, a fluid outlet passage leading from the lowest portion of said chamber, a single valve seat in said fluid outlet passage and disposed exteriorly of said fluid chamber, a valve outlet control assembly having a main supporting member pivotally mounted within said chamber at one end adjacent said fluid outlet discharge passage, a float mounted on the end of said supporting member remote from said pivotally mounted end, a thermally responsive element pivotally mounted at one end on said supporting member, a valve stem connected at one end to said thermally responsive element and extending through said outlet passage to terminate in a valve closure head disposed exteriorly of said fluid chamber and adapted to seat on said valve seat in a direction towards said fluid chamber.

9. A combined float and thermostatically controlled steam trap, as claimed in claim 8, wherein said thermally responsive element comprises at least one bi-metallic segment and said valve stem is mounted to the free end of said bi-metallic segment for sliding axial movement at a point in advance of said axial member pivotal connection.

10. A combined float and thermostatically controlled steam trap, as claimed in claim 8, wherein said thermally responsive element is an expansion bellows, a valve stem supporting frame mounted fixedly on said bellows and said valve stem is connected to said valve stem supporting frame.

References Cited in the file of this patent

UNITED STATES PATENTS

| | | |
|---|---|---|
| 1,006,629 | Chapman | Oct. 24, 1911 |
| 1,571,921 | Hutchinson | Feb. 2, 1926 |
| 2,107,551 | Simpson | Feb. 8, 1938 |